US00RE36762E

United States Patent [19]

Canavan et al.

[11] E Patent Number: Re. 36,762

[45] Reissued Date of Patent: Jul. 4, 2000

[54] PROTECTIVE EYEGLASSES CONSTRUCTION

[75] Inventors: Richard W. Canavan, East Woodstock, Conn.; John G. Matthews, Providence, R.I.

[73] Assignee: Bacou USA Safety, Inc., Smithfield, R.I.

[21] Appl. No.: 08/588,204

[22] Filed: Jan. 19, 1996

Related U.S. Patent Documents

Reissue of:

[64] Patent No.: 5,457,505
Issued: Oct. 10, 1995
Appl. No.: 08/065,944
Filed: May 21, 1993

U.S. Applications:

[62] Division of application No. 07/984,243, Nov. 30, 1992, Pat. No. 5,381,192, which is a continuation of application No. 07/741,557, Aug. 7, 1991, abandoned.

[51] Int. Cl.[7] ..... G02C 5/14

[52] U.S. Cl. ..... 351/120; 351/118; 351/119

[58] Field of Search ..... 351/118, 119, 351/120, 121, 122, 123, 111, 115, 113, 227, 41; 2/453

[56] References Cited

U.S. PATENT DOCUMENTS

| | | | |
|---|---|---|---|
| 3,947,100 | 3/1976 | Vischer, Jr. | 351/120 |
| 4,017,165 | 4/1977 | Davis . | |
| 4,527,291 | 7/1985 | Nussbickl . | |
| 4,563,066 | 1/1986 | Bononi | 351/122 |
| 4,882,807 | 11/1989 | Frye et al. . | |

FOREIGN PATENT DOCUMENTS

| | | |
|---|---|---|
| 804309 | 1/1969 | Canada . |

*Primary Examiner*—Hung X. Dang
*Attorney, Agent, or Firm*—Salter & Michaelson

[57] ABSTRACT

A protective eyeglasses construction includes a frame portion comprising a lense frame piece and a pair of temple frame pieces, and a lense portion on the lense frame piece. The temple frame pieces are pivotally attached to the lense frame piece about vertical pivot axes, and they are adapted to be pivotally adjusted about horizontal pivot axes and longitudinally adjusted to different lengths. The lense frame piece includes an upper frame section and brow bar which is attached to the lense frame piece so that the central portion of the brow bar is spaced rearwardly from the central portion of the upper frame section and resiliently deflectable toward the upper frame section for cushioning the forehead of a wearer against physical shocks delivered to the lense frame piece.

21 Claims, 3 Drawing Sheets

PROTECTIVE EYEGLASSES CONSTRUCTION

Matter enclosed in heavy brackets [ ] appears in the original patent but forms no part of this reissue specification; matter printed in italics indicates the additions made by reissue.

This is a division of [application] *Application* Ser. No. 07/984,243 filed Nov. 30, 1992, now U.S. Pat. No. 5,381,192 which is a continuation of [application] *Application* Ser. No. 07/741,557 filed Aug. 7, 1991 (now abandoned).

BACKGROUND AND SUMMARY OF THE INVENTION

The instant invention relates to protective eyewear, and more particularly to a pair of protective eyeglasses which is adjustable to accommodate different wearers and adapted to be comfortably worn for prolonged periods of time.

While a variety of different types of protective eyeglasses have been heretofore available for protecting the eyes of wearers during participation in hazardous activities, most of the heretofore available protective eyeglasses have not been adapted to be both comfortably worn and adjusted to fit different wearers. Hence, in many cases wearers have been forced to wear uncomfortable, poorly fitting protective eyewear. Further, in some cases, persons have disregarded proper safety procedures, and they failed to wear protective eyewear rather than wearing uncomfortable, poorly fitting safety glasses.

Although protective eyewear having pivotally adjustable temple frame pieces have been previously available, they have generally been either relatively complicated or less than entirely effective. In this regard, the U.S. Pat. No. 4,527,291 to Nussbickl, discloses a safety goggles construction which is effective but relatively complicated. Another previously available eyeglasses construction which, in addition to the Nussbickl patent, represents the closest prior art to the subject invention of which the applicant is aware comprises temple frame pieces which include first and second portions having knurled arcuate surfaces which are received in engagement for adjustably securing the angular positions of the first and second portions. However, it has been found that the knurled surfaces of the first and second portions of temple frame pieces of this type tend to wear quickly, so that they lose their effectiveness for securing the positions of the first and second portions. Hence, these prior art eyeglasses constructions are believed to be of only general interest with respect to the subject invention.

The instant invention provides an effective protective eyeglasses construction which is adjustable to fit various wearers, and which is adapted to be comfortably worn by wearers for prolonged periods of time. Specifically, the instant invention provides a protective eyeglasses construction comprising a frame portion including a lens frame piece and a pair of temple frame pieces which are hingeably attached to the lens frame piece, wherein the temple frame pieces are angularly adjustable about substantially horizontal pivot axes relative to the lens frame piece and longitudinally adjustable to different lengths. The eyeglasses further includes a cushioning brow bar on the upper portion of the lens frame piece for cushioning the forehead of a wearer against shocks transmitted thereto from the eyeglasses, and the temple frame pieces preferably include rear cable sections comprising resilient inner cores made from a relatively hard resilient thermoplastic material and outer layers made from a thermoplastic rubber material and integrally molded on the inner cores.

The temple frame pieces of the eyeglasses include first portions which are hingeably attached to the lens frame piece, and second portions which are pivotally attached to the respective first portions thereof for pivoting about substantially horizontal pivot axes. The first and second portions of the temple frame pieces include closely spaced arcuate surfaces which are substantially concentric with respect to the pivot axes between the respective first and second portions thereof. Further, one of the arcuate surfaces of each temple frame piece has a plurality of ribs thereon and the other arcuate surface of each temple frame piece has a detent thereon which is receivable in engagement with the ribs on the respective other arcuate surface of the same temple frame piece for adjustably securing the relative positions of the first and second portions. Still further, one of the first or second portions of each temple frame piece preferably has a spring slot formed therein adjacent the arcuate surface thereof to allow the arcuate surface thereof to be deflected inwardly slightly as the respective detent of the temple frame piece is passed over the respective ribs thereof. The temple frame pieces are preferably made from a resilient plastic material, and the arcuate surfaces on the first and second portions of the temple frame pieces preferably extend over arcs of less than approximately 180°. The second portions of the temple frame pieces preferably include telescoping front and rear portions and the front portions preferably each have a plurality of longitudinally spaced positioning slots therein. Each of the rear portions preferably has a detent thereon which is receivable in the positioning slots in the respective front portion thereof for releasably securing the relative position of the front and rear portions. In addition, each of the front portions preferably has an elongated longitudinally extending guide slot formed therein, and each of the rear portions preferably has a pin thereon which travels in the guide slot in the front portion thereof for limiting the extent of the longitudinal travel of the rear portions relative to the front portions. In addition, each of the rear portions preferably has a spring slot formed therein adjacent the detent thereon to permit the detent to be deflected inwardly slightly as it is moved between different positioning slots in the respective front portion thereof. Still further, each of the rear portions preferably includes a blade portion which terminates in a tapered terminal end portion, and the pin of each of the rear portions is preferably disposed on the terminal end portion of the blade portion thereof so that it is removable from the respective guide slot thereof by deflecting the tapered terminal end portion away from the guide slot.

It has been found that the protective eyeglasses of the instant invention can be effectively adjusted to fit various wearers and that it can be comfortably worn for prolonged periods of time. Specifically, it has been found that because the second portions of the temple frame pieces are pivotable relative to the first portions and because the rear portions of the temple frame pieces are telescopically adjustable relative to the front portions thereof, the temple frame pieces can be effectively adjusted to accommodate various different wearers. It has been further found that because the protective eyeglasses include a resilient brow bar which is engageable with the forehead of a wearer for protecting the wearer against physical shocks, the eyeglasses of the subject invention are even still more effective. Even still further, it has been found that because the temple frame pieces preferably include composite rear cable sections, the eyeglasses are adapted to be positively yet comfortably retained in position on a wearer.

Accordingly, it is a primary object of the instant invention to provide a pair of protective eyeglasses which can be comfortably worn for a prolonged period of time.

Another object of the instant invention is to provide a pair of protective eyeglasses which can be easily adjusted to accommodate various different wearers.

A still further object of the instant invention is to provide a pair of protective eyeglasses comprising a pair of temple frame pieces which can be angularly adjusted relative to a lens frame piece, and longitudinally adjusted to various lengths.

An even still further object of the instant invention is to provide a pair of protective eyeglasses comprising a lens frame piece and a brow bar on the lens frame piece which is engageable with the forehead of a wearer for cushioning the wearer's forehead against shocks delivered to the lens frame piece.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
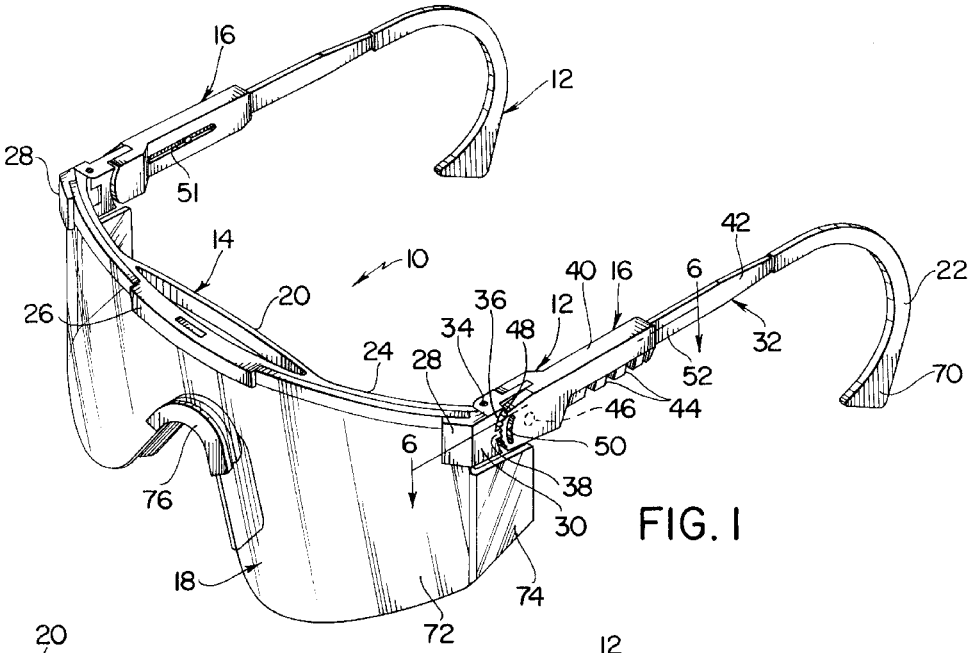
FIG. 1 is a perspective view of the protective eyelasses construction of the instant invention.
Figure 2:
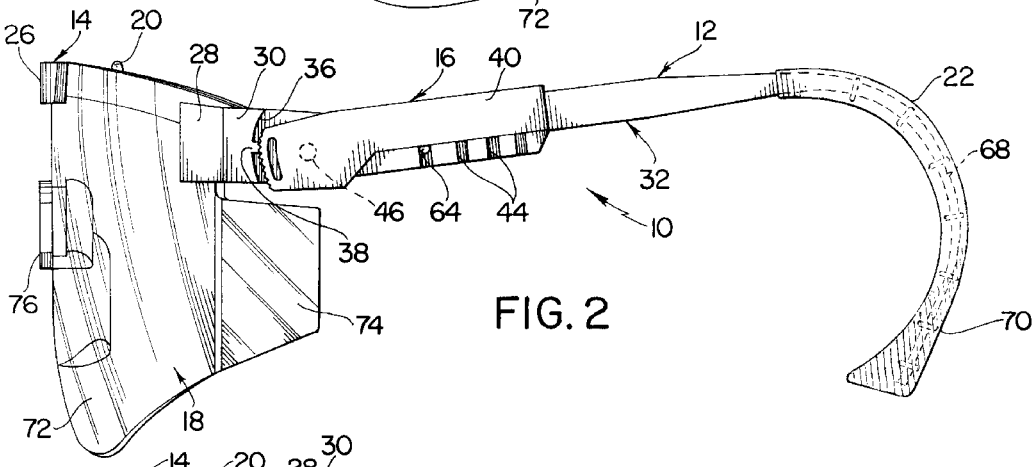
FIGS. 2 and 3 are side elevational views thereof in different adjusted positions.
Figure 3:
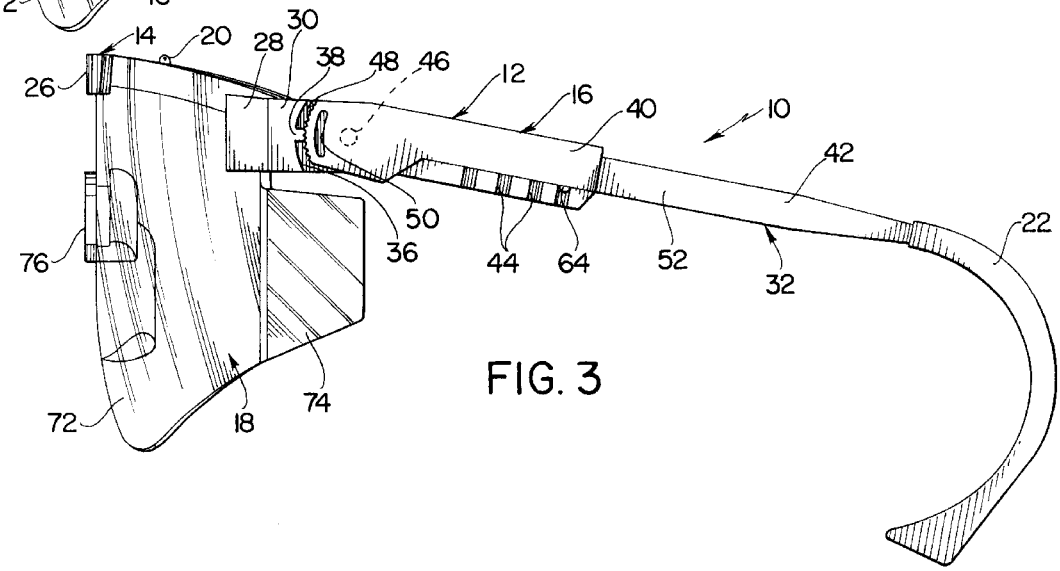
Figure 4:
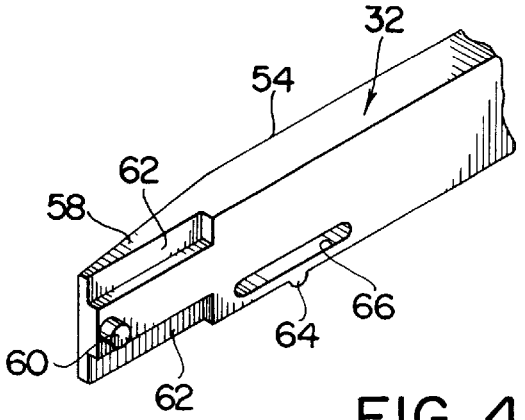
FIG. 4 is an enlarged view of the blade portion of the rear portion of the right temple frame piece thereof.
Figure 5:
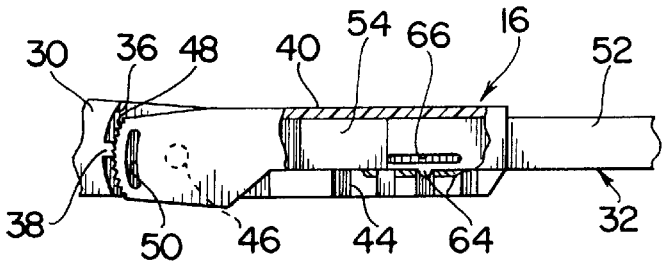
FIG. 5 is a vertical sectional view of the front portion of the left temple frame piece thereof.
Figure 6:
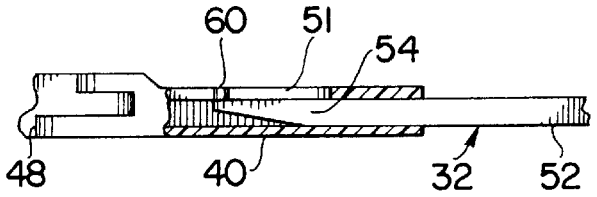
FIG. 6 is a sectional view taken along line 6—6 in FIG. 1.

Referring now to the drawings, the protective eyeglasses construction of the instant invention is illustrated in FIGS. 1 through 8, and generally indicated at 10 in FIGS. 1 through 3, 7, and 8. The eyeglasses construction 10 comprises a frame portion generally indicated at 12 which includes a lens frame piece generally indicated at 14, a pair of temple frame pieces generally indicated at 16, and a lens portion generally indicated at 18. The lens frame piece 14 includes a brow bar 20 which is operative for cushioning the forehead of a wearer against physical shocks delivered to the eyeglasses 10. The temple frame pieces 16 are adapted to be angularly adjusted relative to the lens frame piece 14, and they are adapted to be longitudinally adjusted to different lengths. Further, the temple frame pieces 16 include rear cable sections 22 which are adapted to be comfortably received on the ears of a wearer for securing the eyeglasses 10 on the head of the wearer.

The lens frame piece 14 comprises an elongated arcuate upper frame section 24, an attachment bracket 26 which extends forwardly and downwardly from the upper frame section 24, and the brow bar section 20. The attachment bracket 26 includes a rearwardly facing detent (not shown) for securing the lens piece 18 thereto. The brow bar 20 extends between opposite side portions of the upper frame section 24 in a substantially straight disposition so that it is spaced rearwardly from the central portion of the upper frame section 24. The lens frame piece 14 is preferably made from a suitable durable nylon material so that the upper frame section 24 and the bracket 26 are substantially rigid, but so that the brow bar 20 is resiliently deflectable forwardly relative to the upper frame section 24. The lens frame piece 14 further comprises a pair of opposite end portions 28 which are integrally formed with the upper frame section 24 and which are adapted to be pivotally secured to the temple frame pieces 16.

Each of the temple frame pieces 16 includes a first portion 30 and a two piece second portion generally indicated at 32. Each of the first portions 30 is pivotally attached to one of the end portions 28 for pivoting about a substantially vertical pivot pin 34, and each includes a rearwardly facing arcuate surface 36 having a detent 38 thereon. Each of the second portions 32 includes front and rear portions 40 and 42 which are received in telescoping relation to permit adjustments to the lengths of the temple frame pieces 16. Each of the front portions 40 is of substantially rectangular tubular configuration, and each has a plurality of closely spaced downwardly opening adjustment slots 44 therein. Each of the front portions 40 is pivotally mounted on the respective first portion 30 thereof as at 46, and each includes a knurled or ribbed arcuate surface 48 which faces forwardly toward the arcuate surface 36 of the respective first portion 30 thereof. Each of the front portions 40 has a slot 50 formed therein which is closely spaced from the knurled arcuate surface 48 thereof for defining a resilient spring blade between the arcuate surface 48 thereof and the slot 50 thereof which allows each arcuate surface 48 to be deflected rearwardly slightly. Each of the front portions 40 is further formed and mounted so that the arcuate surface 48 thereof is received in engagement with the detent 38 on the adjacent arcuate surface 36 thereof so that the detent 38 thereof is operative in combination with the adjacent knurled arcuate surface 48 thereof for releasably securing each second portion 32 in various angular positions with respect to the first portion 30 thereof. In this connection, the arcuate surfaces 36 and the arcuate surfaces 48 are preferably concentrically oriented with respect to the pivot points 46 thereof so that the spacing therebetween remains substantially uniform as the second portions 32 are pivoted with respect to the first portions 30. Each of the front portions 40 of the second portions 32 also has an elongated longitudinally extending guide slot 51 formed therein for guiding and limiting the relative travel between the front and rear portions 40 and 42, respectively, thereof.

The rear portion 42 of each of the second portions 32 of the temple frame pieces 16 comprises an elongated substantially straight main section 52, a front telescoping section 54, and a rear cable section 22. The front telescoping sections 54 are illustrated most clearly in FIGS. 4 through 6, and each includes a tapered terminal end portion 58 having a laterally extending guide pin 60 thereon. A pair of elongated side channels 62 are provided in each of the terminal end portions 58 for reducing the overall thickness thereof. A detent 64 is formed on the underside of each of the telescoping sections 54, and a spring slot 66 is formed adjacent each of the detents 64 to enable each detent 64 to be deflected upwardly. The telescoping sections 54 and the main sections 52 are of substantially rectangular cross-sectional configuration, and the telescoping sections 54 are dimensioned to be slidably received in telescoping relation in the front portions 40 of the respective second portions 32 thereof. The detents 64 are positioned so that they are receivable in engagement in the adjustment slots 44 in the respective front portions 40 thereof in order to adjustably secure the longitudinal positions of the rear portions 42 relative to the front portions 40. Further, the telescoping portions 54 are formed so that the pins 60 thereof travel in the guide slots 51 in the respective front portions 40 thereof for both guiding the travel of the telescoping portions 54 in the front portions 40 and for limiting the longitudinal travel of the telescoping portions 54. However, because the telescoping portions 54 include the tapered terminal end portions 58, the terminal end portions 58 can be deflected outwardly to permit the pins 60 to be passed out of their respective guide slots 51 in order to remove the rear portions 42 from their respective front portions 40.

Each of the rear cable sections 22 comprises an inner core section 68 which is integrally molded with the main portion 52 thereof from a suitable nylon thermoplastic, and includes a plurality of spaced transverse anchoring ribs 69. Each of the rear cable sections 22 further comprises an outer casing 70 which is made from a somewhat softer thermoplastic rubber to enable the cable sections 22 to be more comfortably received and worn on the ears of a wearer.

The lens portion 18 comprises a front lens section 72 which is integrally molded in an arcuate configuration from a suitable transparent plastic material, and a pair of side guard sections 74 which extend rearwardly from opposite sides of the front lens section 72. The front lens section 72 has a relatively small centrally located slot (not shown) therein adjacent the upper edge thereof for receiving the detent (not shown) on the attachment bracket 26 in order to retain the front lens section 72 on the lens frame piece 16. The side guards 74 are preferably integrally molded with the front section 72 from a transparent plastic material and they extend rearwardly to protect the eyes of a wearer against objects approaching either side of the wearer's head. The lens portion 18 further comprises a conventional nose piece 26 which is preferably made from a thermoplastic rubber material so that it is operative for cushioning the nose of a wearer as the eyeglasses 10 are supported thereon.

Figure 7:
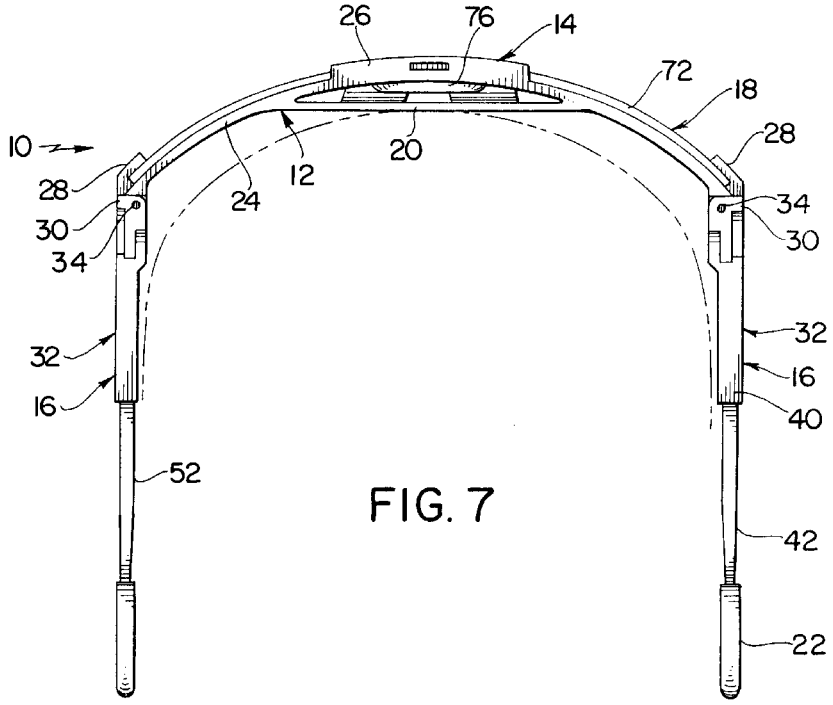
FIGS. 7 and 8 are top plan views illustrating the operation of the brow bar.
Figure 8:
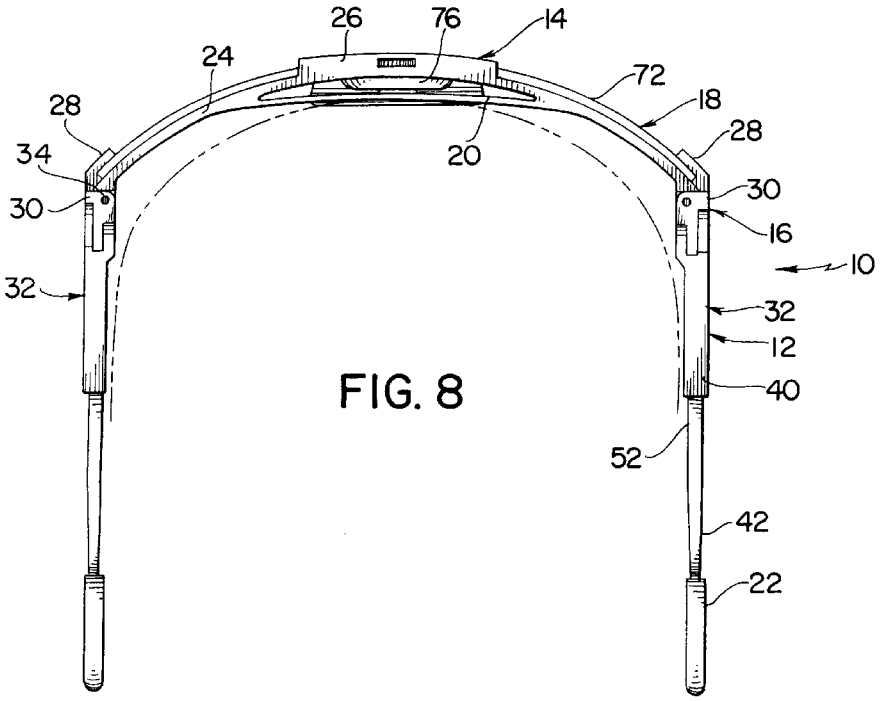

For use of the protective eyeglasses 10 the angular positions of the second portions 32 are adjustable relative to the first portions 30 of the temple frame pieces 16 by repositioning the detents 38 relative to the arcuate surfaces 48. Further, the lengths of the temple frame pieces 16 are adjustable by telescopically adjusting the rear portions 42 relative to the front portions 40. Specifically, the lengths of the temple frame pieces 16 are adjustable by repositioning the detents 64 in different slots 44 in the front portions 40. The eyeglasses 10 can then be comfortably worn on the head of a wearer, and when they are in position on the wearer, the brow bar 20 is either positioned in contact with or in closely adjacent relation to the forehead of the wearer. As illustrated in FIGS. 7 and 8, when a shock is delivered to the eyeglasses 10 which causes the frame portion 14 to be moved rearwardly on the head of the wearer from the position illustrated in FIG. 7 to the position illustrated in FIG. 8, the brow bar 20 is resiliently moved forwardly to cushion the shock applied to the wearer by the frame portion 14.

It is seen therefore that the instant invention provides an effective protective eyeglasses construction. The eyeglasses 10 are effectively adjustable to accommodate various different wearers, and they are adapted to cushion the forehead of a wearer against shocks delivered to the frame portion 14. Further, the eyeglasses 10 are adapted to be comfortably worn by a wearer over prolonged periods of time. Accordingly, it is seen that the eyeglasses of the instant invention represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed

1. In a protective eyeglasses construction comprising a frame portion including a lens frame piece and a pair of temple frame pieces hingeably attached to said lens frame piece and lens means on said lens frame piece, the improvement comprising each of said temple frame pieces including a first portion which is hingeably attached to said lens frame piece for pivoting about a substantially vertical hinge axis and a second portion which is pivotally attached to the respective first portion thereof for pivoting about a substantially horizontal pivot axis, each of said temple frame pieces including a pair of closely spaced arcuate surfaces which are substantially concentric with respect to the pivot axis thereof, one of the arcuate surfaces of each temple frame piece being disposed on the first portion thereof, the other arcuate surface of each temple frame piece being disposed on the second portion thereof, one arcuate surface of each pair having rib means thereon, the other arcuate surface of each pair having a detent thereon which is received in engagement with the rib means on the other arcuate surface of the same pair for adjustably securing the relative positions of the first and second portions of the temple frame pieces.

2. In the protective eyeglasses construction of claim 1, one of said first and second portions of each temple frame piece having a slot formed therein which is closely spaced from and substantially parallel to the arcuate surface thereon, each of said slots cooperating with the respective adjacent arcuate surface thereof to define a resilient spring blade therebetween which allows the arcuate surface thereof to be deflected slightly as the detent of the same temple piece is passed over the adjacent rib means.

3. In the protective eyeglasses of claim 2, said temple frame piece being made from a resilient thermoplastic.

4. In the protective eyeglasses of claim 1, each of said first and second portions which has said rib means thereon having a spring slot formed therein which is closely spaced from and substantially parallel to the arcuate surface thereon, each of said spring slots cooperating with the respective arcuate surface thereof to define a resilient spring blade therebetween which allows the arcuate surface thereof to be deflected slightly as the detent of the same temple frame piece is passed over the adjacent rib means.

5. In the protective eyeglasses of claim 1, said arcuate surfaces extending over arcs of less than approximately 180°.

6. In the protective eyeglasses of claim 1, each of said temple frame pieces including a rear cable section which is adapted to be received on an ear of a wearer, each of said cable sections including an inner core made from a substantially rigid resilient thermoplastic and an outer layer made from a thermoplastic rubber material and molded onto the respective inner core thereof.

7. In the protective eyeglasses of claim 6, each of said inner core including a plurality of transverse anchoring ribs for anchoring the respective outer layer thereof.

8. In a protective eyeglasses construction comprising a frame portion including a lens frame piece and a pair of temple frame pieces hingeably attached to said lens frame piece and lens means on said lens frame piece, the improvement comprising each of said temple frame pieces including a first portion which is hingeably attached to said lens frame piece for pivoting about a substantially vertical hinge axis and a second portion which is pivotally attached to the respective first portion thereof for pivoting about a substantially horizontal pivot axis, each of said temple frame pieces including a pair of closely spaced arcuate surfaces which are substantially concentric with respect to the pivot axis thereof, one of the arcuate surfaces of each temple frame piece being disposed on the first portion thereof, the other arcuate surface of each temple frame piece being disposed on the second portion thereof, one arcuate surface of each pair having rib means thereon, the other arcuate surface of each pair having a detent thereon which is received in engagement with the rib means on the other arcuate surface of the same pair for adjustably securing the relative positions of the first and second portions of the temple frame pieces, each of said second portions of said temple frame pieces including telescoping front and rear portions and means for releasably retaining said front and rear portions in a plurality of different telescopically adjusted positions.

9. In the protective eyeglasses of claim 8, each of said front portions being at least partially of generally tubular configuration, each of said rear portions being telescopically received in the respective front portion thereof.

10. In the protective eyeglasses of claim 9, each of said front portions having a plurality of longitudinally spaced positioning slots therein, each of said rear portions including a detent which is receivable in the positioning slots in the respective front portion thereof for adjustably securing the positions of the front and rear portions of said temple frame pieces.

11. In the protective eyeglasses of claim 10, each of said rear portions having a spring slot formed therein adjacent the detent thereof to permit the detent thereof to be deflected inwardly slightly as the latter is moved between different positioning slots in the respective front portion thereof.

12. In the protective eyeglasses of claim 9, each of said front portions having an elongated longitudinally extending guide slot therein, each of said rear portions having a pin thereon which travels in the elongated longitudinally extending guide slot in the front portion thereof for limiting the extent of the longitudinal travel of the rear portions of said temple frame pieces relative to the front portions thereof.

13. In the protective eyeglasses of claim 12, each of said front portions being at least partially of substantially rectangular tubular configuration, each of said rear portions including a blade portion of substantially rectangular cross sectional configuration which is received in the respective tubular front portion thereof.

14. In the protective eyeglasses of claim 13, each of said blade portions terminating in a tapered terminal end portion, each of said pins being disposed on the tapered terminal end portion of the respective blade portion thereof, each of aid tapered terminal end portions being deflectable slightly to permit the pin thereon to be deflected out of the respective longitudinal slot thereof.

15. In a protective eyeglasses construction comprising a frame portion including a lens frame piece and a pair of temple frame pieces hingeably attached to said lens frame piece and lens means on said lens frame piece, the improvement comprising each of said temple frame pieces including a first portion which is hingeably attached to said lens frame piece for pivoting about a substantially vertical hinge axis and a second portion which is pivotally attached to the respective first portion thereof for pivoting about a substantially horizontal pivot axis, each of said temple frame pieces including a pair of closely spaced arcuate surfaces which are substantially concentric with respect to the pivot axis thereof, one of the arcuate surfaces of each temple frame piece being disposed on the first portion thereof, the other arcuate surface of each temple frame piece being disposed on the second portion thereof, one arcuate surface of each pair having rib means thereon, the other arcuate surface of each pair having a detent thereon which is received in engagement with the rib means on the other arcuate surface of the same pair for adjustably securing the relative positions of the first and second portions of the temple frame pieces, said lens frame piece including a substantially horizontally extending arcuate upper frame section having inwardly and outwardly facing sides, said inwardly facing side being concave, said outwardly facing side being convex, and a substantially horizontally extending resilient elongated brow bar section having opposite ends which are attached to the inwardly facing side of said lens frame section, said brow bar section including a center portion which is spaced rearwardly from said upper frame section, said center section being resiliently deflectable toward said upper frame section and being engageable with the forehead of a wearer for cushioning the wearer's forehead against shocks transmitted thereto from said lens frame piece.

16. In a protective eyeglasses construction comprising a frame portion including a lens frame piece, a pair of temple frame pieces, means for pivotally attaching said temple frame pieces to said lens frame piece for pivoting about substantially vertical pivot axis and angular adjusting means for angularly adjusting the angular position of each temple frame piece relative to said lens frame piece by pivoting at least a portion of each temple frame piece about a substantially horizontal pivot axis, each of said angular adjusting means including first and second closely spaced arcuate surfaces which are movable relative to each other for pivoting at least a portion of the respective temple frame piece thereof about a substantially horizontal pivot axis, rib means on one of the arcuate surfaces thereof and detent means on the other arcuate surfaces thereof engaging the respective rib means thereof for releasable securing the relative positions of the arcuate surfaces thereof.

17. In the protective eyeglasses of claim 16, each of said angular adjusting means including a slot adjacent one of the arcuate surfaces thereof to permit the arcuate surface to which the slot is adjacent to be deflected slightly as the respective detent means thereof is passed over the respective rib means thereof.

*18. In a protective eyeglasses construction comprising a frame portion including a lens frame piece and a pair of temple frame pieces attached to said lens frame piece and lens means on said frame piece, the improvement comprising each of said temple frame pieces including a first portion which is attached to said lens frame piece and a second portion which is pivotally attached to the respective first portion thereof for pivoting about a substantially horizontal pivot axis, each of said temple frame pieces including a pair of closely spaced arcuate surfaces which are substantially concentric with respect to the pivot axis thereof, one of the arcuate surfaces of each temple frame piece being disposed on the first portion thereof, the other arcuate surface of each temple frame piece being disposed on the second portion thereof, one arcuate surface of each pair having rib means thereon, the other arcuate surface of each pair having a detent thereon which is received in engagement with the rib means on the other arcuate surface of the same pair for adjustably securing the relative positions of the first and second portions of the temple frame pieces.*

*19. In the protective eyeglasses construction of claim 18, one of said first and second portions of each temple frame*

*niece having a slot formed therein which is closely spaced from and substantially parallel to the arcuate surface thereon, each of said slots cooperating with the respective adjacent arcuate surface thereof to define a resilient spring blade therebetween which allows the arcuate surface thereof to be deflected slightly as the detent of the same temple piece is passed over the adjacent rib means.*

*20. In the protective eyeglasses of claim 18, each of the said first and second portions which has said rib means thereon having a spring slot formed therein which is closely spaced from said substantially parallel to the arcuate surface thereon, each of said spring slots cooperating with the respective arcuate surface thereof to define a resilient spring blade therebetween which allows the arcuate surface thereof to be deflected slightly as the detent of the same temple frame piece is passed over the adjacent rib means.*

*21. In the protective eyeglasses of claim 18, said arcuate surfaces extending over arcs of less than approximately 180°.*

* * * * *